Feb. 7, 1961 H. E. VAUGHAN 2,971,060

TELEPHONE LINE CIRCUIT

Filed April 28, 1959

INVENTOR
H. E. VAUGHAN
BY Kenneth B Hamlin
ATTORNEY 2,971,060

TELEPHONE LINE CIRCUIT

Henry E. Vaughan, Chatham, N.J., assignor to Bell Telephone Laboratories, Incorporated, New York, N.Y., a corporation of New York Filed Apr. 28, 1959, Ser. No. 809,405

6 Claims. (Cl. 179—18)

Figures 1, 2:
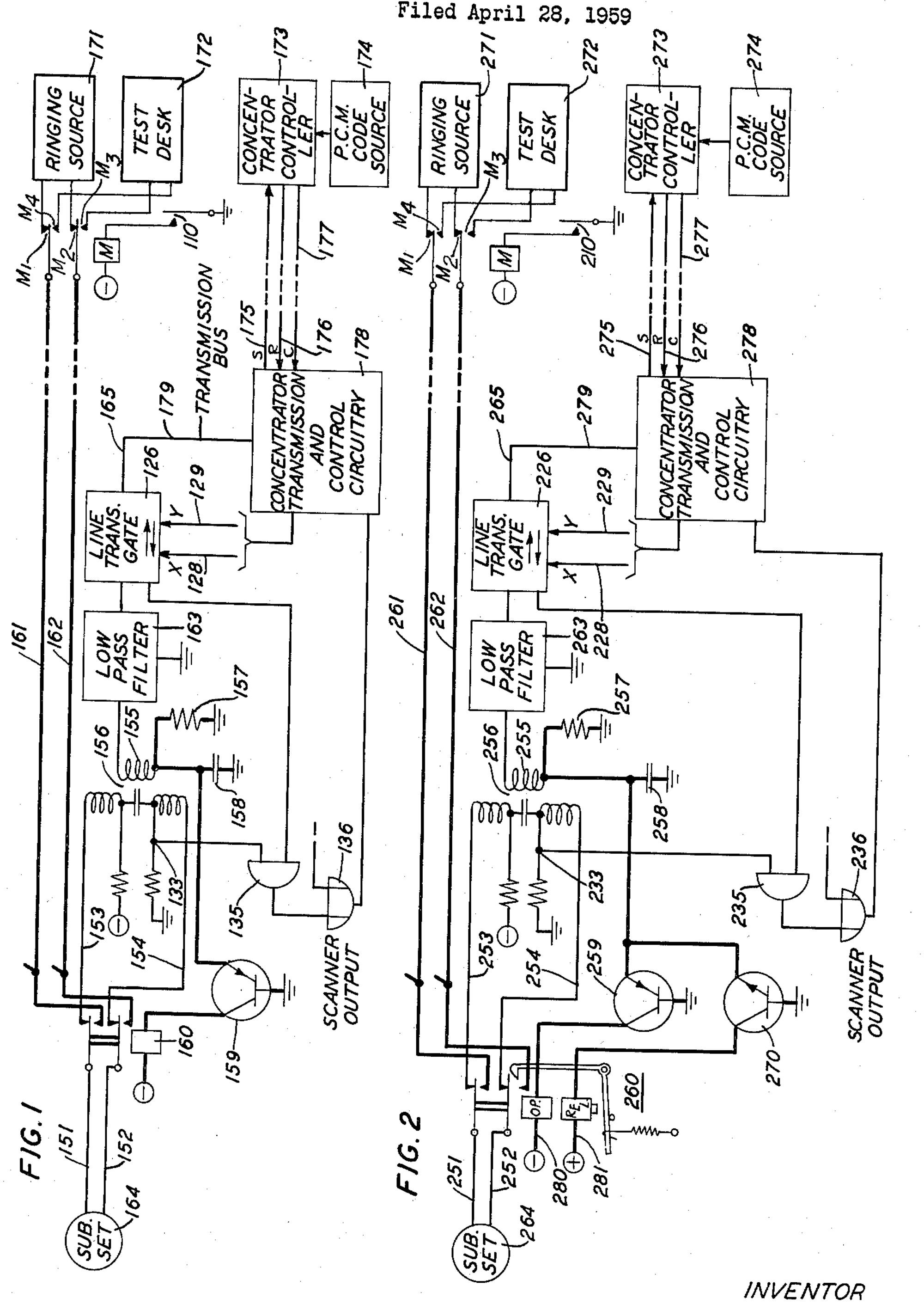

This invention relates in general to electronic switching and transmission systems and more particularly to an improved line circuit for an electronic telephone switching system.

Recently, a variety of electronic telephone switching systems have been described both in patents and technical literature. Many of these systems employ devices such as gas tubes, diodes, transistors, et cetera, in their transmission paths and these devices generally are not capable of handling normal low frequency telephone ringing signals. The above-noted devices are not limited in their transmission frequency characteristics, but rather in their power handling capacities. Examples of systems employing such transmission switching elements are found in W. A. Budlong, G. G. Drew, and J. A. Harr Patent 2,955,165 of October 4, 1960, and in D. B. James, J. D. Johannesen, M. Karnaugh, and W. A. Malthaner Patent 2,957,949 of October 25, 1960.

In each of the above-noted systems, subscribers' stations are alerted by the means of low level tones which are amplified at the subscriber's set and thereafter employed to energize an electro-acoustic transducer in the subscriber's station equipment.

It is an object of this invention to permit the use of telephone station equipment employing low frequency alternating current ringers in an electronic telephone system.

It is a further object of this invention to substantially relax the insulation requirements of the telephone line connecting a subscriber station of an electronic telephone system and the remote concentrator in which the subscriber's line terminates.

It is still another object of this invention to permit routine tests to be applied to a subscriber line of an electronic switching system from a telephone central office.

These and other objects of this invention are achieved in specific illustrative embodiments wherein a line relay is provided for each subscriber's line terminating in a line concentrator. The line relay is arranged to transfer the subscriber's line from the line winding of an impedance matching transformer to a source of ringing current. The relay is energized from a transistor amplifier which is responsive to a particular PCM (pulse code modulation) ringing control signal which is transmitted from the central office in lieu of PCM signals in presentation of speech or other information.

In one mode of operation the PCM ringing control signals are transmitted from the central office during the entire active ringing period; however, in another mode of operation, a mechanical latch relay is employed, and this relay is similarly energized from a transistor amplifier which is responsive to the above-noted PCM ringing control signal. In this second mode of operation, a second discrete PCM signal is transmitted from the central office to terminate the ringing connection in order to provide a silent interval between active ringing periods. The second or turn-off PCM signal enables a second transistor amplifier which in turn energizes a release coil in the above-noted mechanical latch relay.

In arrangements in accordance with this invention, called lines are advantageously scanned during the silent interval of a ringing cycle, and therefore supervisory scanning can be accomplished without alteration of the line circuitry or of the scanner circuitry.

In accordance with one feature of this invention, subscribers' telephone sets including low frequency alternating current ringers are employed with an electronic telephone switching system.

In accordance with another feature of this invention, subscribers' telephone stations operating from an electronic telephone switching system are alerted by means of low frequency ringing currents which are selectively connected to subscribers' stations under control of specific ringing control signals which are transmitted from the central office.

In accordance with another feature of this invention, subscribers' lines connected to a remote concentrator of an electronic telephone switching system may be tested from the telephone central office.

The above and other objects and features are achieved in specific illustrative embodiments in which:

Fig. 1 is a schematic representation of a line circuit in accordance with this invention and a portion of a remote concentrator of an electronic telephone switching system; and Fig. 2 is a variation of a portion of Fig. 1.

The telephone switching system disclosed in the above noted James et al. patent is a pulse code modulation time division multiplex telephone switching and transmission system. In this system, subscribers' lines comprise normal voice frequency wire facilities which terminate in a remote concentrator. There are a plurality of remote concentrators which are each connected to a telephone central office by means of groups of three broadband transmission channels. Transmission between a subscriber and a remote concentrator is on an analog basis, while transmission between concentrators and between a concentrator and the central office is on a time division multiplex PCM basis. Broadband transmitting and receiving transmission paths are provided between each remote concentrator and the central office, and, in addition, a broadband control path is provided between the central office and each remote concentrator for the purpose of controlling switching within the remote concentrators. In the subject invention, there is provided also a balanced transmission path between the remote concentrator and the central office. This latter path has a voice frequency transmission characteristic and is employed to transmit ringing current from the central office to the remote concentrator and is also used in the performance of subscriber line tests.

In the system disclosed in the above-noted James et al. patent, pulse coded signals varying in time in accordance with the desired ringing tone are transmitted in code form from the central office to a remote concentrator over the receiving transmission path. The coded signals are decoded and the analog of the code transmitted to the subscriber's station where it is amplified and employed to activate the electro-acoustic transducer which is located in the subscriber set. In the subject invention, a particular recognizable PCM code is transmitted from the central office to a remote concentrator over the receiving transmission path and is directed to a subscriber's line which is being called. In one specific illustrative embodiment, the PCM signal which is transmitted to initiate ringing is representative of the most positive analog level. The positive analog signal is integrated and the integrated signal is employed to turn on a transistor which in turn operates a relay. Where a mechanical latch relay is employed, the active ringing period is terminated by the transmission of a PCM signal which is representative of the most negative analog level. The integrated negative signal is employed to turn on a second transistor, which in turn energizes the release coil of the mechanical latch relay.

This invention can best be understood by reference to the following discussion of the aforementioned James et al. patent and to Figs. 1 and 2 of the drawing of the present disclosure.

In the drawing of this disclosure, the elements added to the arrangements disclosed in the above-mentioned James et al. patent are shown in heavy outline. In Fig. 1 the line circuit comprising the subscriber's set 164, the line conductors 151 and 152, the line transformer 156, the low pass filter 163, the line transmission gate 126, concentrator transmission bus 179, and the scanning gates 135 and 136 are taken from Fig. 4 of the copending James et al. application. The concentrator transmission and control circuitry 178 is shown only as a single element in Fig. 1; however, it is to be understood that this block includes all of the arrangements shown in Figs. 4, 5 and 6 of the James et al. patent.

The concentrator controller 173 and the PCM code source 174 are counterparts of the office control module 104 or 104*a* shown in Figs. 1 and 1A of the James et al. patent.

Fig. 2 of this application, like Fig. 1, is derived from the detailed drawing of the James et al. patent and Fig. 2 is a variation of a portion of Fig. 1.

In Fig. 1 of the drawing, a ringing control circuit in the remote concentrator comprising capacitor 158, resistor 157, transistor 159, relay 160, and conductors 161 and 162, is employed to connect ringing current from the central office source 171 to the called subscriber's lines 151 and 152. A ringing cycle comprises an On or active ringing period during which time ringing current is transmitted to the subscriber's set followed by a silent interval and this again is followed by an active period. In Fig. 1 there is shown a PCM code source 174 and a central office concentrator controller 173. By means of tone gates in concentrator controller 173, such as are shown in Fig. 9 of the above-noted James et al. patent a PCM code from source 174 is transmitted to the remote concentrator transmission and control circuitary 178 via the receiving pair 176. Pair 176 of Fig. 1 is the counterpart of pair 201 in the James et al. patent. Ringing is initiated by transmission of the PCM code representative of the highest positive speech analog signal from the central office concentrator controller 173 to the concentrator transmission and control circuitry 178. The PCM signal is decoded in 178 and transmitted via the transmission bus 179 to the input conductor 165 of the line transmission gate 126. The decoded signal on bus 179 is transmitted through the bidirectional line transmission gate 126, the low pass filter 163, and the primary 155 of transformer 156. During an active ringing period, the analog signal thus transmitted is the highest positive analog level and this signal is integrated in the capacitor 158. In successive time division frames, the line gate 126 is enabled during the time slot in which subscriber's set 164 is being served. The collector-base junction of transistor 159 is back-biased by the negative battery supply which is connected to the winding of relay 160. The positive integrated signal at the junction of capacitor 158 and resistor 157 is sufficient to forward-bias the emitter-to-base junction of transistor 159 and thereby sufficient current flows in the collector circuit to operate relay 160.

The subscriber's line comprising conductors 151 and 152 is connected through the normally made back contacts of relay 160 to the conductors 153 and 154 which are the line terminals of the transformer 156. Accordingly, except when relay 160 is energized, the subscriber's line conductors 151 and 152 are connected through the transformer 156 to the low pass filter 163 and the bidirectional line transmission gate 126. When relay 160 is energized, the subscriber's line conductors 151 and 152 are disconnected from the line winding of transformer 156 and are connected to the conductors 161 and 162. As seen in Fig. 1, the conductors 161 and 162 are connected through the normally made switch break contacts M1 and M2 of transfer relay M to the ringing source 171 and alternatively through the switch make contacts M3 and M4 of relay M to the test desk 172. With the contacts M1 and M2 closed and M3 and M4 open, (relay M released), ringing current is applied over conductors 161 and 162, the make contacts of relay 160 and subscriber's line conductors 151 and 152 to the subscriber's set 164. Relay M may be operated by operating key 110 at test desk 172 when it is desired to use conductors 161 and 162 for testing purposes.

Assuming a 2-second On, 4-second Off ringing cycle, the PCM code representative of the ringing start or active period signal is transmitted from the code source 174 through tone gates in the concentrator controller 173 to the remote concentrator during the time slot in which the called subscriber's station 164 is served for a 2-second period. That is, once each frame for a 2-second period, the code representative of the ringing start signal is transmitted from the central office to the remote concentrator for each line being rung at any particular time.

Since a 2-second On, 4-second Off ringing cycle is employed, it is possible to provide three distinct ringing cycles. That is, since each ringing cycle comprises a 6-second interval, there may be three distinct 2-second active ringing periods. Such a program of ringing can be employed to advantage to prevent unequal loads on the ringing current source. For example, if a variable number of lines were to be simultaneously energized with ringing current from the source 171, the transmission losses in the pair comprising conductors 161 and 162 would vary in accordance with the instantaneous loading and the ringing voltage supplied to the subscriber's set would vary considerably. If up to three lines can be simultaneously rung without adverse loading effects, then with a 2-second On, 4-second Off ringing cycle, nine lines in any given concentrator may be simultaneously rung. With twenty-three active time slots, it is doubtful that more than nine of these would be employed in terminating calls at any given time.

Scanning of subscribers' lines to detect answers is performed during the silent interval of the ringing period; therefore, the scanning arrangements disclosed in the James et al. patent may be applied without alteration. During the silent ringing interval, the ringing control relay 160 or 260 is in its released condition and the subscribers' line conductors such as 151 and 152 are connected through the normally made back contacts of the ringing control relay to the line terminals of the impedance matching line transformer. Accordingly, the subscriber's set is connected to the line side of the line transformer and to the scanning circuitry.

Where remote concentrators are employed, there is always the problem of performing normal routine tests on a subscriber's line as there is the problem of breaking the line at the remote concentrator. As shown in Fig. 1, the conductors 161 and 162 may be connected either to the ringing supply 171 or to the test desk 172. During light load periods such as the hours between midnight and early morning, routine line tests may be performed without fear of interfering with the operation of the concentrator or of a subscriber's line. However, since the transmission pair comprising conductors 161 and 162 is common to all subscribers in the concentrator, it is advantageous to provide a signal from the concentrator controller for indicating that a subscriber's line is to be rung and that testing should be temporarily halted. Such a signal can be readily derived from the call progress word coder-decoder described in the above-mentioned James et al patent. Thus, a signal derived from gate ringing flip-flop 1152 in Fig. 11 of the James et al. application can be employed to open the operate path for relay M, and thereby the transmission pair comprising conductors 161 and 162 can be automatically pre-empted for ringing purposes. The transfer arrangement shown is illustrative; other arrangements, well known in the art, could be used to perform the transfer function. Transfer of the subscriber's line from the line winding of the transformer 156 to the conductors 161 and 162 is accomplished by means of the same PCM code signal whether the line is to be rung or tested. When a line is to be tested, key 110 is operated, operating relay M, and the conductors 161 and 162 are disconnected by means of break contacts M1 and M2 from the ringing supply 171 and are connected by contacts M3 and M4 to the test desk 172. When the conductors 161 and 162 are connected through contacts M3 and M4 to the test desk 172 and the subscriber's line conductors 151 and 152 are connected through the make contacts of relay 160 to conductors 161 and 162, the central office test desk operator may perform a variety of tests on the subscriber's line and the subscriber's subset 164.

Certain of the elements of Fig. 2 are counterparts of similar elements in Fig. 1. Where there is a correspondence, the elements are labeled with numbers having similar second and third digits. The first digit of the label is representative of the figure in which the element appears. For example, in Fig. 1, the line transmission gate is labeled 126 while in Fig. 2 the line transmission gate is labeled 226.

When, as shown in Fig. 2, a mechanical latch relay 260 is employed, a first PCM signal is employed to energize the operate winding 280 of relay 260 and another PCM signal is employed to energize the release winding 281. The first or start ringing PCM signal is representative of the most positive analog signal and this signal when integrated appears as a positive voltage at the junction of resistance 257 and capacitor 258. This positive voltage is sufficient to turn on transistor 259 and thereby effects enablement of the operate mechanism of the mechanical latch relay 260. Relay 260 of Fig. 2 is the counterpart of relay 160 of Fig. 1; therefore, operation of relay 260 will transfer the subscriber's line conductors such as 251 and 252 from the line winding of the transformer such as 256 to the ringing supply and test desk conductors 261 and 262. Again, assume a 2-second On, 4-second Off ringing cycle. The mechanical latch relay 260 will be permitted to remain latched in its operated position for two seconds after which time a second or stop ringing PCM signal representative of the most negative analog signal is transmitted from the central office to the remote concentrator in the time slot in which the called party is being served. The most negative analog signal, again after integration, appears as a voltage at the junction of resistance 257 and capacitor 258, and this voltage is sufficient to turn on transistor 270 and thereby energize the release winding 281 of the relay 260.

The above description is but illustrative of the principles of this invention, and it is obvious to one skilled in the art that other arrangements can be readily devised from these teachings without departing from the spirit and scope of the subject invention.

What is claimed is:

1. In a telephone system, the combination comprising a central office, a subscriber's line, a trunk connecting said central office to said subscriber's line, means in said central office for transmitting discrete control signals over said trunk, a transformer interposed between said subscriber's line and said trunk, a switching circuit individual to said subscriber's line, and a source of signaling power, said switching circuit arranged to disconnect said subscriber's line from said transformer and to connect said subscriber's line to said signaling power source in response to said discrete signals.

2. In a telephone system, the combination comprising a central office, a plurality of subscriber lines, a remote line concentrator, a plurality of transmission paths connecting said remote concentrator and said central office, means in said central office for transmitting address signals individual to said subscribers' lines over one of said paths, means in said central office for transmitting ringing control signals over another of said paths, a ringing signal source, a transmission line connecting said ringing signal source to said remote concentrator, switching means in said remote concentrator responsive to said address signals and said ringing control signals for individually and selectively connecting said ringing signal source to said subscribers' lines.

3. A telephone system in accordance with claim 2 wherein said switching means comprises an integrating circuit, a transistor having base, emitter, and collector electrodes, said emitter terminal connected to said integrating circuit, a relay having a winding thereupon, one terminal of said winding connected to said collector, and a source of potential connected to the other terminal of said winding.

4. A telephone system in accordance with claim 2 wherein said switching means comprises an integrating circuit, first and second transistors having emitter, base, and collector terminals, said emitter terminals connected to said integrating circuit, a mechanical latching relay having a two-terminal operate winding and a two-terminal release winding thereupon, one terminal of said operate winding connected to the collector terminal of one of said transistors, and one terminal of said release winding connected to the collector terminal of the other of said transistors, a first source of potential of one polarity connected to the other terminal of said operate winding, and a second source of potential of opposite polarity to said first source of potential connected to the other terminal of said release winding.

5. A telephone system in accordance with claim 2 wherein said ringing control signals comprise multibit pulse code modulation signals and wherein said switching means in said remote concentrator includes decoding means for converting said pulse code modulation signals to analog signals.

6. In a telephone system in accordance with claim 2, the combination further comprising a test desk in said central office for testing the condition of said subscriber's line, and means for transferring said transmission line from said ringing signal source to said test desk.

References Cited in the file of this patent

UNITED STATES PATENTS 2,824,173 Meacham ------------ Feb. 18, 1958